(12) United States Patent (10) Patent No.: US 9,131,566 B2
Rudolph (45) Date of Patent: Sep. 8, 2015

(54) BUCK CONVERTER FOR OPERATING AT LEAST ONE LED

(71) Applicant: Bernd Rudolph, Forstern (DE)

(72) Inventor: Bernd Rudolph, Forstern (DE)

(73) Assignee: OSRAM GmbH, Munich (DE)

( * ) Notice: Subject to any disclaimer, the term of this patent is extended or adjusted under 35 U.S.C. 154(b) by 231 days.

(21) Appl. No.: 13/948,926

(22) Filed: Jul. 23, 2013

(65) Prior Publication Data

US 2014/0021878 A1    Jan. 23, 2014

(30) Foreign Application Priority Data

Jul. 23, 2012    (DE) .......................... 10 2012 212 875

(51) Int. Cl.
*H05B 33/08*    (2006.01)
*H02M 1/08*    (2006.01)
*H02M 3/156*    (2006.01)

(52) U.S. Cl.
CPC ............. *H05B 33/0815* (2013.01); *H02M 1/08* (2013.01); *H02M 3/156* (2013.01); *Y02B 20/346* (2013.01)

(58) Field of Classification Search
USPC .................................................. 315/201–208
See application file for complete search history.

(56) References Cited

U.S. PATENT DOCUMENTS

| | | | |
|---|---|---|---|
| 6,359,392 B1* | 3/2002 | He ................................. | 315/291 |
| 6,940,735 B2* | 9/2005 | Deng et al. ...................... | 363/37 |
| 7,804,256 B2* | 9/2010 | Melanson ....................... | 315/291 |
| 8,933,637 B2* | 1/2015 | Deng et al. ................ | 315/200 R |
| 2005/0218838 A1* | 10/2005 | Lys .................................. | 315/291 |
| 2008/0285271 A1* | 11/2008 | Roberge et al. ............... | 362/235 |
| 2012/0287685 A1* | 11/2012 | Fahlenkamp ................... | 363/49 |
| 2013/0313989 A1* | 11/2013 | Chen ......................... | 315/200 R |
| 2014/0320005 A1* | 10/2014 | Roberts et al. ................... | 315/34 |

FOREIGN PATENT DOCUMENTS

| | | |
|---|---|---|
| DE | 10 2009 042 419 | 3/2011 |
| DE | 10 2010 013 319 | 10/2011 |
| EP | 1 868 284 | 6/2006 |
| WO | WO 2012/104062 | 8/2012 |

* cited by examiner

*Primary Examiner* — Brandon S Cole
(74) *Attorney, Agent, or Firm* — Cozen O'Connor

(57) ABSTRACT

A buck converter for operating at least one LED. In this case, the buck inductor comprises a first buck inductor and a second buck inductor, wherein a charge pump is coupled between the coupling point of the two buck inductors and a supply connection of a control apparatus which is used for actuating a buck switch.

8 Claims, 2 Drawing Sheets

(SdT)

BUCK CONVERTER FOR OPERATING AT LEAST ONE LED

RELATED APPLICATION

Figure 1:
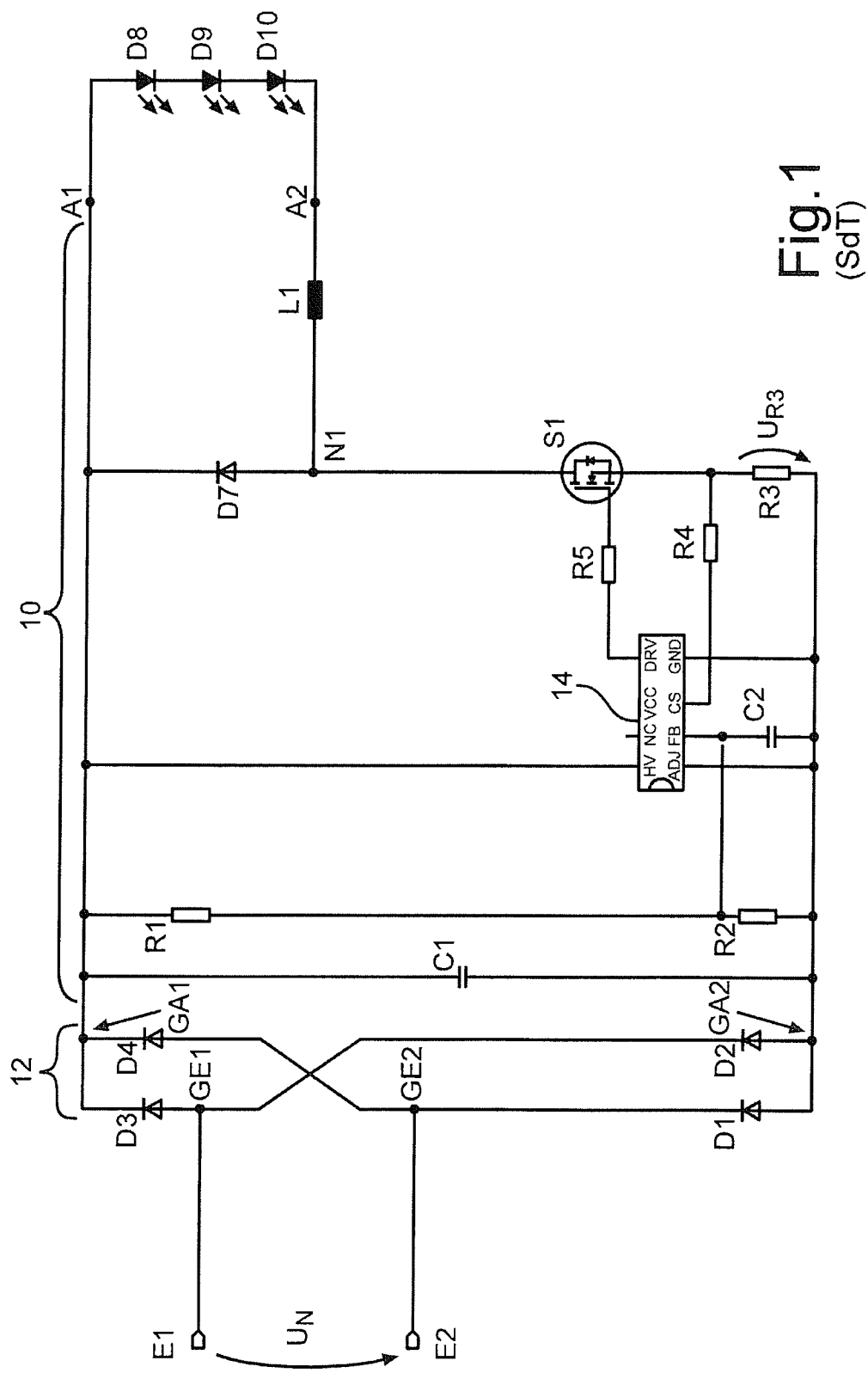

This application claims the priority of German application no. 10 2012 212 875.1 filed Jul. 23, 2012.

FIELD OF THE INVENTION

The present invention relates to a buck converter for operating at least one LED comprising an input with a first input connection and a second input connection for coupling to a DC supply voltage, an output with a first output connection and a second output connection for coupling to the at least one LED, wherein the first input connection is coupled to the first output connection of the buck converter, a buck diode, a buck switch and at least one buck inductor, wherein the buck diode and the buck switch are connected in series, and this series circuit is coupled in series between the first input connection and the second input connection so as to form a first coupling point, wherein the at least one buck inductor is coupled between the first coupling point and the second output connection of the buck converter, and a control apparatus with an output, which is coupled to the buck switch, wherein the control apparatus furthermore comprises a supply connection, which is coupled to one of the two input connections.

BACKGROUND OF THE INVENTION

With the advancement of LEDs into broad sectors of general lighting, there is the need for particularly simple and inexpensive power supply circuits for these component parts. A basic circuit for LEDs which is in widespread use is a mains-operated buck converter, as is illustrated by way of example in FIG. 1. The buck converter 10 illustrated has an input with a first input connection E1 and a second input connection E2, which can be coupled directly to an AC supply voltage $U_N$. The inputs GE1, GE2 of a rectifier 12 are coupled to the input connections E1, E2, said rectifier comprising the diodes D1 to D4. In this case, the buck converter 10 is operated on an AC supply voltage, and therefore a rectifier is provided. Alternatively, the buck converter 10 can also be operated directly on a DC supply voltage, as a result of which the rectifier is then no longer needed.

A capacitor C1 with small dimensions in respect of a high mains power factor in comparison with the load operating on the buck converter is coupled between a first output connection GA1 of the rectifier and a second output connection GA2. A voltage divider which comprises nonreactive resistors R1 and R2 is connected in parallel with the capacitor C1. The tap of the voltage divider R1, R2 is supplied to a control apparatus 14, wherein the parallel circuit comprising the nonreactive resistor and a capacitor C2 is used for filtering a voltage present at the input E1, E2, with the result that reliable information on the present value of the input voltage $U_N$ is available at the input FE. In order to supply the control apparatus 14, said control apparatus is likewise coupled to the rectifier outputs GA1, GA2. The buck converter 10 comprises a buck diode D7 and a buck switch S1, which are coupled in series to form a current measuring resistor R3 between the rectifier outputs GA1, GA2. The voltage drop $U_{R3}$ across the resistor R3 is supplied to the control apparatus 14 via a resistor R4. The control apparatus 14 is designed to actuate the control electrode of the switch S1 via a resistor R5. The actuation takes place in particular in such a way that the buck converter 10 is operated in a discontinuous mode. The operating frequency is preferably between 20 and 500 kHz, for example 65 kHz.

The buck converter 10 has an output with a first output connection A1 and a second output connection A2, between which a multiplicity of series-connected LEDs D8, D9, D10 are coupled in this case as load. The number of LEDs coupled to the output A1, A2 is preferably between 1 and 20.

A buck inductor L1 is coupled between the coupling point N1 of the buck diode D7 and the buck switch S1, on one side, and the output connection A2, on the other side. In the charging phase of the buck converter, a current flows in the circuit GA1, A1, D8, D9, D10, A2, L1, N1, S1, R3, GA2. In this case, the buck inductor is magnetized. In the discharging phase, the buck switch S1 is closed and the buck inductor L1 is demagnetized. Therefore, a current flows in the circuit L1, D7, A1, D8, D9, D10, A2.

In the buck converter 10 illustrated in FIG. 1, the power supply to the control apparatus 14 takes place via the input HV. This power supply is dissipative. In view of the fact that such control apparatuses have a current consumption of a few mA, this procedure is undesirable for steady-state operation. Instead, a simple power supply to the control apparatus 14 with as few losses as possible is desirable.

In this context, it is known to implement an auxiliary power supply for the control apparatus 14 by virtue of the fact that an auxiliary winding is provided on the buck inductor L1. However, this results in the disadvantage that the buck inductor L1 becomes a special component part, thereby undesirably increasing the implementation costs for specific applications.

SUMMARY OF THE INVENTION

One object of the present invention is to provide a buck converter of the generic type such that the buck converter has as high a degree of efficiency as possible without in the process needing to use special component parts.

This and other objects are attained in accordance with one aspect of the present invention is directed to a buck converter for operating at least one LED. The buck converter has an input with a first input connection and a second input connection for coupling with a DC supply voltage, and an output with a first output connection and a second output connection for coupling with the at least one LED. The first input connection is coupled to the first output connection of the buck converter. Also included are a buck diode, a buck switch and at least one buck inductor, wherein the buck diode and the buck switch are connected in series, and this series circuit is coupled in series between the first input connection and the second input connection so as to form a first coupling point, wherein the at least one buck inductor is coupled between the first coupling point and the second output connection of the buck converter. In addition, a control apparatus is provided having an output, which is coupled to the buck switch, wherein the control apparatus furthermore comprises a supply connection, which is coupled to one of the two input connections. The at least one buck inductor comprises the series circuit comprising a first buck inductor and a second buck inductor, wherein a second coupling point is formed between the first buck inductor and the second buck inductor. The buck converter furthermore comprises a charge pump, which is coupled on the input side to the second coupling point and on the output side to the supply connection of the control apparatus.

Thus, a significant feature of an embodiment of the present invention is that the buck inductor is implemented as a series circuit comprising a first buck inductor and a second buck inductor, wherein a second coupling point is formed between the first buck inductor and the second buck inductor. A buck converter according to the invention furthermore comprises a charge pump, which is coupled to this second coupling point on the input side and to the supply connection of the control apparatus on the output side. If a charge pump were to be coupled to the node N1, see FIG. 1, several disadvantages would result, however, which are explained in more detail further below.

By virtue of the present invention, the use of inexpensive standard inductors, for example so-called "drum cores", for the buck inductor is possible.

Standard component parts can in any case be used for the charge pump. In this way, an inexpensive auxiliary power supply for the control apparatus of the buck converter can be realized which results in a high degree of efficiency.

A preferred embodiment is characterized by the fact that the charge pump comprises the series circuit comprising at least one first capacitor and a two-way rectifier.

Preferably, the control apparatus is coupled to a reference potential, wherein the two-way rectifier is likewise coupled to this reference potential. In this way, substantially the total voltage present at the second coupling point is available for supplying the control apparatus.

In one embodiment of the invention, the control apparatus is supplied in a runup phase initially from a DC supply voltage which is obtained, for example, from an AC supply voltage via a rectifier, and then via the auxiliary power supply, i.e. the coupling to the second coupling point. If the voltage at the second coupling point is below the predeterminable supply voltage of the control apparatus, supply via the rectifier output can again take place without any problems.

Preferably, the charge pump comprises a first diode and a second diode, wherein the first diode is coupled between the connection of the first capacitor, which is not coupled to the second coupling point, and the supply connection of the control apparatus, wherein the second diode is coupled between the coupling point of the first capacitor and the first diode, on one side, and the reference potential, on the other side.

Preferably, the charge pump furthermore comprises a second capacitor, which is coupled between the second supply connection and the reference potential. In order to limit the voltage passed via the auxiliary power supply to the control apparatus, a Zener diode is preferably provided, which is connected in parallel with the second capacitor.

Preferably, in respect of the demands to be placed on the first and second buck inductors in terms of dielectric strength, the inductance of the first buck inductor is substantially equal, in particular equal, to the inductance of the second buck inductor.

The first buck inductor and the second buck inductor can be wound onto a common magnetic core, which results in the advantage that only one inductive component part is required. As a result, the amount of space required for implementing the solution according to the invention can be reduced.

BRIEF DESCRIPTION OF THE DRAWING(S)

Figure 2:
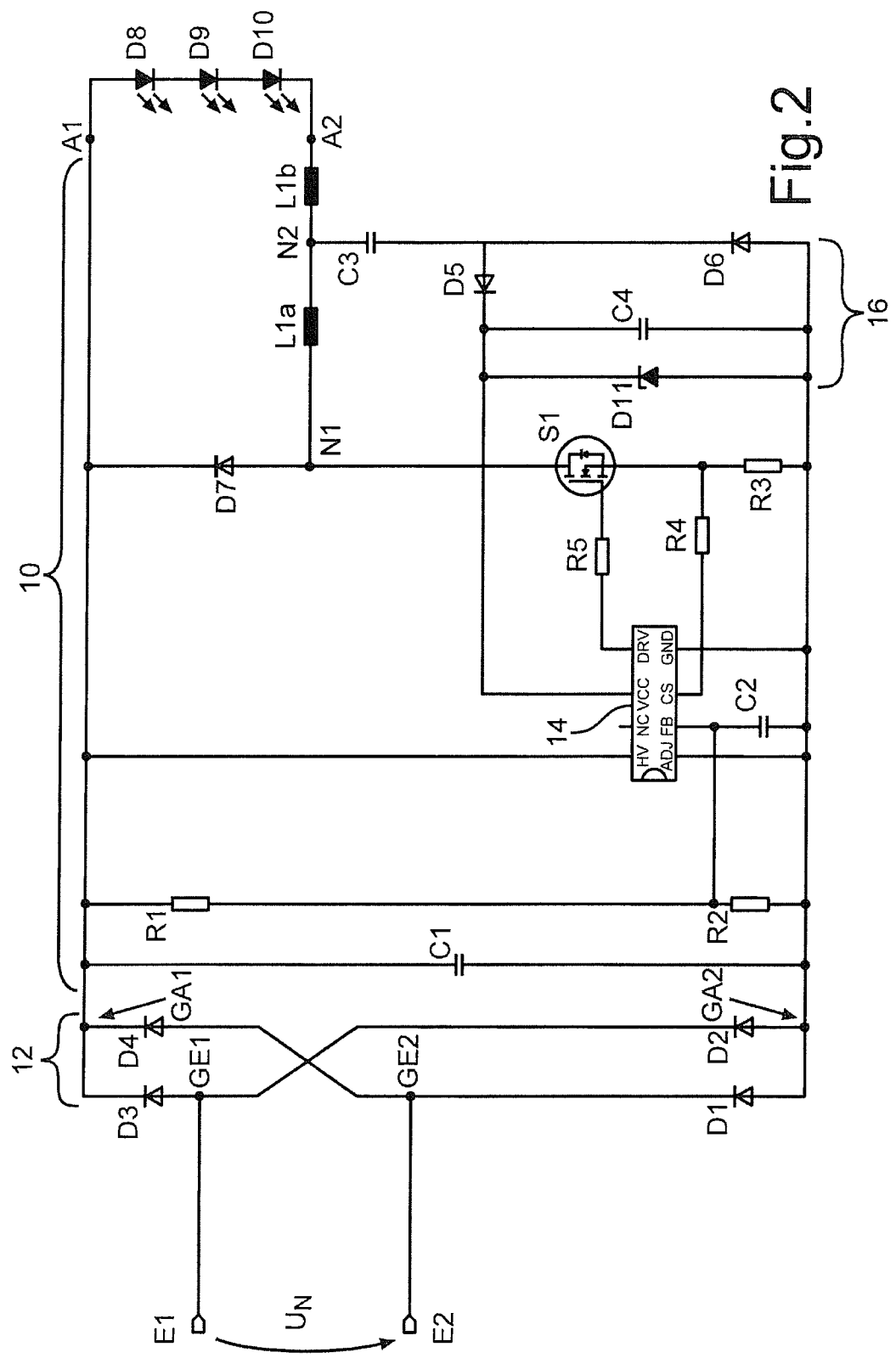

FIG. 1 shows a schematic illustration of a buck converter known from the prior art; and FIG. 2 shows a schematic illustration of an exemplary embodiment of a buck converter according to the invention.

DETAILED DESCRIPTION OF THE DRAWINGS

The reference symbols introduced with reference to FIG. 1 are still used insofar as they relate to identical and functionally identical components. For reasons of clarity, these are not introduced again.

FIG. 2 shows, in a schematic illustration, an exemplary embodiment of a buck converter 10 according to the invention. In comparison with FIG. 1, in this case the buck inductor L1 is divided into a first buck inductor L1a and a second buck inductor L1b. The coupling point of the two buck inductors is denoted by N2. The input of a charge pump 16 is coupled to the coupling point N2, and the output of said charge pump is coupled to the connection VCC of the control apparatus 14 in order to provide said control apparatus with an auxiliary power supply. The connections HV and VCC of the control apparatus 14 are coupled to one another internally, i.e. can be considered as one connection for the embodiments below.

The charge pump 16 comprises the series circuit comprising a capacitor C3 and a two-way rectifier, which comprises the diodes D5 and D6. The charge pump 16 furthermore comprises a capacitor C4, which is coupled between the connection VCC of the control apparatus 14 and the reference potential. The diode D5 is coupled on the anode side to that connection of the capacitor C3 which is remote from the coupling point N2 and on the cathode side to the connection VCC of the control apparatus 14. The diode D6 is coupled to the coupling point of the capacitor C3 and the diode D5, on one side, and to the reference potential, on the other side.

A Zener diode D11 is connected in parallel with the capacitor C4 for limiting the voltage at the input VCC of the control apparatus 14.

The inductance of the first buck inductor L1a is equal to the inductance of the second buck inductor L1b.

If the input of the charge pump 16 were to be coupled to the node N1 instead of the node N2, the energy in the capacitor C3 would be discharged via the buck switch S1 to the reference potential. Current peaks would occur during switch-on, and these current peaks would cause, as losses, heating of the switch S1 and the nonreactive resistor R3. In particular when using such a buck converter in retrofit lamps in which the components are packed very densely, where possible a heat input originating via the LEDs should be dispensed with. Furthermore, the operation of the entire buck converter 10 is at risk since, owing to the current peaks, the control circuit 14 could prematurely interrupt the charging phase of the buck inductor L1 (pin CS=Current Sense). Both disadvantages are avoided by the solution according to the invention illustrated in FIG. 2.

In this solution, there are no longer any current peaks since the inductance L1a has a current-limiting effect. As a result, thermal losses in the switch S1 and in the nonreactive resistor R3 can be avoided, as a result of which firstly the efficiency of the buck converter 10 is increased and secondly the use in retrofit lamps is favored.

Furthermore, the circuit can be dimensioned more easily and more safely for the following reason: the input CS of the control apparatus 14 serves the purpose of disconnecting the switch S1 when a predeterminable maximum value is reached. Owing to the mentioned current peaks during switch-on of the switch S1 as a result of the discharge of the capacitor C3, in the case of a buck converter in which the charge pump is coupled at the node N1, either the current through the switch S1 would have to be filtered, which would result in additional complexity in terms of circuitry and increased losses, or the control apparatus would have to ignore the signal CS on switch-on of the switch S1 for a certain amount of time (leading edge blanking). As a result, steady-state operation of the buck converter 10 would be made more difficult. These problems do not occur in the buck converter 10 according to the invention illustrated in FIG. 2.

A preferred integrated circuit for the control apparatus 14 is known, for example, under the designation NCP1217. As is obvious to a person skilled in the art, however, other control apparatuses are likewise suitable for the use.

A switch for power factor correction can be coupled between the rectifier 12 and the capacitor C1.

As is obvious to a person skilled in the art, the buck converter 10 can also be operated directly from a DC supply voltage source. In this case, the rectifier 12 can be dispensed with.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A buck converter for operating at least one LED comprising:
    an input with a first input connection and a second input connection for coupling with a DC supply voltage;
    an output with a first output connection and a second output connection for coupling with the at least one LED, wherein the first input connection is coupled to the first output connection of the buck converter;
    a buck diode;
    a buck switch;
    at least one buck inductor,
    wherein the buck diode and the buck switch are connected in series, and this series circuit is coupled in series between the first input connection and the second input connection so as to form a first coupling point, wherein the at least one buck inductor is coupled between the first coupling point and the second output connection of the buck converter; and
    a control apparatus with an output, which is coupled to the buck switch, wherein the control apparatus furthermore comprises a supply connection, which is coupled to one of the two input connections;
    wherein the at least one buck inductor comprises the series circuit comprising a first buck inductor and a second buck inductor, wherein a second coupling point is formed between the first buck inductor and the second buck inductor;
    wherein the buck converter furthermore comprises a charge pump, which is coupled on the input side to the second coupling point and on the output side to the supply connection of the control apparatus.

2. The buck converter as claimed in claim 1, wherein the charge pump comprises the series circuit comprising at least one first capacitor and a two-way rectifier.

3. The buck converter as claimed in claim 2, wherein the control apparatus is coupled to a reference potential, wherein the two-way rectifier is likewise coupled to this reference potential.

4. The buck converter as claimed in claim 2, wherein the charge pump comprises a first diode and a second diode, wherein the first diode is coupled between the connection of the first capacitor, which is not coupled to the second coupling point, and the supply connection of the control apparatus, wherein the second diode is coupled between the coupling point of the first capacitor and the first diode, on one side, and the reference potential, on the other side.

5. The buck converter as claimed in claim 4, wherein the charge pump furthermore comprises a second capacitor, which is coupled between the supply connection and the reference potential.

6. The buck converter as claimed in claim 5, wherein a Zener diode is connected in parallel with the second capacitor.

7. The buck converter as claimed in claim 1, wherein the inductance of the first buck inductor is substantially equal to the inductance of the second buck inductor.

8. The buck converter as claimed in claim 1, wherein the first buck inductor and the second buck inductor are bound onto a common magnetic core.

* * * * *